United States Patent Office 3,499,898
Patented Mar. 10, 1970

3,499,898
2-AMINOPHENYL AND 2-AMINOPYRIDYL PYRIMIDINES HAVING AN AMINO OR AMIDO GROUP IN THE 5-POSITION
Walter von Bebenburg and Kurt Thiele, Frankfurt am Main, Germany, assignors to Deutsche Gold- und Silber-Scheideanstalt vormals Roessler, Frankfurt am Main, Germany
No Drawing. Filed Nov. 7, 1967, Ser. No. 681,095
Claims priority, application Germany, Nov. 9, 1966, D 51,494
Int. Cl. C07d 51/42
U.S. Cl. 260—256.4                    2 Claims

ABSTRACT OF THE DISCLOSURE

Substituted amino pyrimidines having valuable anti-inflammatory and anti-pyretic properties which are of the formula

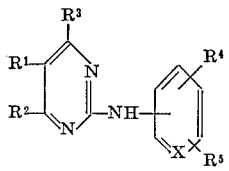

wherein:
$R^1$ is —$NH_2$, —NHCO-lower alkyl, —NHCO-lower alkenyl or —NHCOO-lower alkyl;
Each of $R^2$ and $R^3$ taken individually is H, $NH_2$ or OH;
$R^4$ is H, —NH-phenyl, —NH-phenyl-$CF_3$, —$CF_3$, lower alkyl, lower alkoxy or halogen;
$R^5$ is H, lower alkyl, lower alkoxy or halogen; and
X is =CH— or =N—.

---

The present invention relates to novel substituted amino pyrimidines as described above which have been found to have valuable anti-inflammatory and anti-pyretic properties.

The compounds according to the invention can be prepared by reacting a compound of the formula

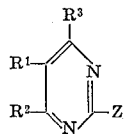

with a compound of the formula

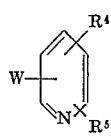

in which Z and W are different and are either a halogen atom or an amino group or a hydroxy group in the presence of an alkaline condensing agent at an elevated temperature, if desired, in the presence of a solvent. $R^1$—$R^5$ and X have the same significance as above and in addition $R^1$—$R^3$ also can be —$NO_2$ which subsequently can be hydrogenated catalytically using Raney nickel or palladium or platinum as hydrogenation catalysts or be hydrogenated with nascent hydrogen, such as with zinc/HCl, tin/HCl and the like, to convert the $NO_2$ group to the $NH_2$ group. The latter when in 5 position of the pyrimidine ring ($R^1$) can then be acylated with acyl halides or acid anhydrides using conventional methods using temperatures below 100° C., preferably, below 50° C., and when more than one amino substitutent is present only with sufficient acylating agent for one amino group.

The compounds according to the invention also can be prepared by reacting a compound of the formula

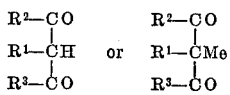

wherein Me signifies alkali metal or a derivative of malonic acid dinitrile or seminitrile with a compound of the formula

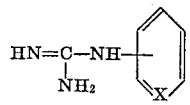

in an inert solvent at an elevated temperature, if desired, with addition of an acidic or basic catalyst and, if necessary subsequently reducing a nitro, oximino, nitroso or hydroxy amino group to the amino group.

The bases which are obtained can be converted to their acid addition salts in a known manner with pharmaceutically acceptable acids such as hydrochloric, sulfuric, acetic, maleic, fumaric or malonic acid. Those bases which contain optically active carbon atoms and as a rule are produced as racemates can be resolved into their optically active components in a known manner by reaction with an optically active acid and fractionated precipitation. However, optically active isomers can be used as the starting material.

As already indicated, the novel compounds according to the invention have valuable anti-inflammatory and anti-pyretic properties. For instance, when tested according to the method of Domenjoz et al., Arch. exp. Pharm. Path. 230, 325 (1957) in carrageen edema of the rat paw it was found that they possessed strong anti-inflammatory action at oral dosages between 1 and 300 m./kg. The best compounds according to the invention at a dosage of 300 mg./kg. oral gave a 60–70% reduction in the edema whereas the known anti-inflammatory agent phenylbutazone only gives a 50% reduction at this dosage. Also, for instance, when the compounds were tested according to the method of Büch, Arch. intern. Pharmacodyn. 123, 140 (1959), it was found that they possessed strong antipyretic activity at oral dosages between 1 and 300 mg./kg. The best compounds at a dosage in the range of 6.25–12.5 mg./kg. oral caused a 50% reduction in fever. The compounds according to the invention are marked by their compatability which is indicated by their low acute toxicity. The best of the compounds according to the invention are about ten times less toxic than phenylbutazone (mouse, rat). The acute toxicity on mice expressed by the LD 50 in mg./kg. is between 500 and 5700 mg./kg. oral (determined according to the method of Miller and Tainter, Proc. Soc. Exper. Biol. and Med. 57, 261 (1944)).

The following examples will serve to illustrate the invention.

EXAMPLE 1

2-phenylamino-5-nitro-pyrimidine

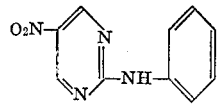

20 g. (0.126 mol) of 2-chloro-5-nitro-pyrimidine were added to 34 g. (0.38 mol) of aniline at 80° C. while stirring. The mixture was then heated for 30 minutes to 150° C. After cooling down an excess of 10% HCl was added and the undissolved material filtered off. This was then crystallized from acetic acid and from methanol-water.

The melting point of the product was 200–201° C. The yield was 5 g.

EXAMPLE 2

(a) 2-phenylamino-5-nitro-pyrimidine.—A solution of 0.5 mol of freshly prepared sodium nitro-malonaldehyde in 500 ml. of water and 20 ml. of a 40% solution of benzyl trimethyl ammonium hydroxide in methanol were added while stirring to a solution of 172 g. (1 mol) of phenyl guanidine·HCl in 50 ml. of water. The mixture was then stirred for 8 hours on a water bath whereby the addition compound which originally precipitated out went into solution and the reaction product crystallized out. It was filtered off hot and recrystallized from ethanol.

Its melting point was 202–203° C. The yield was 83 g.

(b) 2 - (m - trifluoromethyl-phenylamino)-5-nitro-pyrimidine was prepared by a procedure analogous to that under (a) from 0.45 mol of m-trifluoromethyl-phenyl-guanidine and 0.25 mol of freshly prepared sodium-nitro-malonaldehyde. The reaction product was first recrystallized from ethanol and then from benzene/gasoline.

Its melting point was 110–145° C. and the yield 42 g.

(c) 2 - (2,3-dimethyl-phenylamino)-5-nitro-pyrimidine was prepared and purified by a procedure analogous to that under (a) from 0.25 mol of 2,3-dimethyl-phenyl, guanidine·HCl and 0.20 mol of sodium nitro-malonaldehyde. Its melting point was 180–181° C. and the yield was 30 g.

(d) 2 - (2,3 - dichloro-phenylamino)-5-nitro-pyrimidine was prepared and purified by a procedure analogous to that under (a) from 0.5 mol of 2,3-dichloro-phenylguanidine and 0.25 mol of sodium nitromalonaldehyde. Its melting point was 173–175° C. and the yield 12 g.

(e) 2 - (p-methylsulfonyl-phenylamino)-5-nitro-pyrimidine was prepared by a procedure analogous to that under (a) from 0.3 mol of p-methylsulfonyl-phenylguanidine and 0.25 mol of sodium nitromalonaldehyde. The reaction product was recrystallized twice from dimethyl formamide and a little water. Its melting point was 298–303° C. and the yield 10 g.

(f) 2 - (p - phenylamino-phenylamino)-5-nitro-pyrimidine was prepared by a procedure analogous to that under (a) from 0.4 mol p-phenylamino-phenylguanidine·HCl and 0.35 mol of sodium nitromalonaldehyde. The reaction product was recrystallized twice from dioxane-gasoline. Its melting point was 180–184° C. and the yield 60 g.

(g) 2 - [2 - phenylamino - pyridyl-(5)-amino]-5-nitro-pyrimidine was prepared and purified by a procedure analogous to that under (a) using 2-(phenylamino)-5-guanidino-pyridine and sodium nitromalonaldehyde. Its melting point was 255–261° C.

(h) 2 - [2 - (m-trifluoromethyl-phenylamino)-pyridyl-(5)-nitro-pyrimidine was prepared and purified by a procedure analogous to that under (a) using 2-(m-trifluoromethyl - phenylamino) - 5-guanidino-pyridine and sodium nitromalonaldehyde. Its melting point was 210–211° C.

(i) 2 - (p - chlorophenylamino)-5-nitro-pyrimidine was prepared by a procedure analogous to that under (a) from 1 mol of p-chlorophenyl guanidine·HCl and 0.8 mol of sodium nitromalonaldehyde. The product was recrystallized twice from dioxane. Its melting point was 185° C. and the yield 59% of theory.

(j) 2 - (p - methoxyphenylamino) - 5 - nitro-pyrimidine was prepared by a procedure analogous to that under (a) from 1 mol of p-methyl phenyl guanidine and 0.8 mol of sodium nitromalonaldehyde. The product was recrystallized from dioxane. Its melting point was 179–180° C. and the yield 71% of theory.

EXAMPLE 3

(a) 2 - phenylamino - 5 - amino-pyrimidine.—83 g. of 2-phenylamino-5-nitro-pyrimidine were hydrogenated at atmospheric pressure in contact with 10 g. of palladium-active carbon (10%) as catalyst in 1 liter of ethanol. The hydrogenated mixture was filtered and the filtrate boiled down to 300 ml. The amine crystallized out on cooling. Its melting point was 137° C. and the yield 49 g. A further 15 g. of the product was obtained by boiling down the mother liquor further.

(b) 2 - (m - trifluoro - methyl-phenylamino)-5-amino-pyrimidine was prepared analogously by hydrogenation of 95 g. of 2-m-trifluoromethyl-phenylamino-5-nitro-pyrimidine. The melting point of the base was 118° C. and the yield 30 g. The HCl salt was obtained in the form of crystals upon addition of isopropanolic HCl to a solution of the base in ethanol. The melting point of the HCl salt was 190° C.

EXAMPLE 4

(a) 2 - (p - methylsulfonyl - phenylamino) - 5 - amino-pyrimidine.—10 g. of 2-(p-methylsulfonyl-phenylamino-5-nitro-pyrimidine were hydrogenated at atmospheric pressure in 350 ml. of dioxane in contact with 5 g. of palladium-active carbon (10%). The HCl salt crystallized out from the hydrogenated solution after removal of the catalyst upon addition of isopropanolic HCl and a little ether. It was recrystallized from methanol. Its melting point was 203–204° C. and the yield 6 g.

(b) 2 - [2 - phenylamino-pyridyl-(5)-amino]-5-amino-pyrimidine was prepared analogously by hydrogenation of 19.5 g. of 2-[2-phenylamino-pyridyl-5-amino]-5-nitro-pyrimidine and the HCl salt obtained upon addition of the isopropanolic HCl. Its melting point was 210° C. and the yield 15 g. The free base was precipitated by addition of ammonium hydroxide to the aqueous solution of the salt. Its melting point was 180–187° C.

(c) 2 - [2 - (m - trifluoromethyl-phenylamino)-pyridyl-(5)-amino]-5-amino-pyrimidine was produced analogously from 2 - [2 - (m - trifluoromethyl-phenylamino)-pyridyl-(5)-amino]-5-nitro-pyrimidine. The free base had a melting point of 195–197° C. and the yield 60% of theory.

EXAMPLE 5

2-(p-methoxy-phenylamino)-5-amino-pyrimidine

2 - (p - methoxy - phenylamino)-5-nitro-pyrimidine was hydrogenated by a procedure analogous to that used in Example 4a. After the catalyst had been filtered off and the hydrogenation solution boiled down, it was dried with sodium sulfate and gasoline added until clouding occurred. The amine crystallized out. Its melting point was 105–110° C. and its yield was 65% of theory.

EXAMPLE 6

(a) 2-phenylamino-5-propionylamino-pyrimidine.—30 g. of 2-phenylamino-5-amino-pyrimidine were dissolved in 200 ml. of dioxane and 15 ml. of propionyl chloride added thereto while stirring and cooling. After 1 hour water was added slowly until the yellow precipitate which first formed dissolved, then dilute aqueous ammonia was added until crystallization began. The mixture was cooled down to 0° C. and the crystals filtered off and recrystallized from benzene/gasoline. The melting point of the product was 188° C. and the yield 25 g.

(b) 2-phenylamino-5-carbethoxyamino-pyrimidine was prepared analogously using chloroformic acid ethyl ester. Its melting point was 177–181° C. and the yield 8 g. (from 9.5 g. of amine).

(c) 2-phenylamino-5-acryloylamino-pyrimidine was also prepared analogously using acrylic acid chloride. The melting point of the product was 200–203° C. and the yield 13 g. (from 13 g. of amine).

(d) 2 - (m - trifluoromethyl - phenylamino) - 5 - propionylamino-pyrimidine was also prepared analogously using 12 g. of 2-(m-trifluoromethyl-phenylamino)-5-amino pyrimidine and propionyl chloride. The melting point of the product was 238° C. and the yield 8 g.

(e) 2-(m-trifluoromethyl-phenylamino)-5-carbethoxyamino-pyrimidine was prepared analogously using 11 g. of 2 - (m - trifluoromethyl - phenylamino) - 5 - aminopyrimidine and chloroformic acid ethyl ether. The melting point of the product was 225–227° C. and the yield 6 g.

EXAMPLE 7

2-(p-methylsulfonyl-phenylamino)-5-propionylamino-pyrimidine 10 ml. of propionyl chloride were added to a hydrogenation solution, as prodlced in Example 4a, while stirring. After several hours' standing the crystals which had precipitated were filtered off, dissolved in methanol and aqueous ammonia added to the solution until clouding resulted. The product which crystallied out was recrystallided from dimethyl formamide and water. The melting point thereof was 268–270° C. and the yield 4 g.

EXAMPLE 8

(a) 2 - (p - phenylamino - phenylamino) - 5 - propionylamino-pyrimidine.—20 g. of 2-(p-phenylamino-phenylamino)-5-nitropyrimidine were hydrogenated at atmospheric pressure in 400 ml. of dioxane in contact with 5 g. Pd-active carbon (10%). The solution was filtered and 10 ml. of propionyl chloride added thereto. Thereafter aqueous ammonia was added whereby the salt which first precipitated went into solution. Upon further addition of water the base of the product crystallized out and was recrystallized from methanol.

(b) 2-(p-phenylamino-phenylamino)-5-pivoloyl-pyrimidine was prepared analogously using pivoloyl chloride. Its melting point was 202–204° C. and the yield 8 g.

EXAMPLE 9

(a) 2 - [2 - phenylaminopyridyl - (5) - amino] - 5 - propionylamino-pyrimidine.—19.5 g. of 2-[2-phenylaminopyridyl-(5)-amino]-5-nitro-pyrimidine was hydrogenated in 500 ml. of dioxane in contact with 2 g. of Pd-active carbon (10%) at atmospheric pressure. After filtration the hydrogenated solution was reacted with 6 g. of propionyl chloride while stirring. After 90 minutes a solid product was filtered off and recrystallized from water with the addition of a little ammonium hydroxide. The melting point of the product was 208–209° C. and the yield 15 g.

(b) 2 - [2 - phenylamino - pyridyl - (5) - amino] - 5 - carbethoxyamino-pyrimidine was prepared and purified analogously using chloroformic and ethyl ester instead of the propionyl chloride. The melting point of the product was 206–208° C. and the yield 13 g.

(c) 2 - [2 - (m - trifluoromethyl - phenylamino) - pyridyl-(5)-amino]-5-carbethoxyamino-pyrimidine was prepared analogously using the hydrogenation solution of Example 3c and again using chloroformic acid ethyl ester. The melting point of the product was 210–212° C. and the yield 76% of theory.

(d) 2 - [2 - phenylamino - pyridyl - (5) - amino] - 5 - pivaloylamino-pyrimidine was produced analogously using pivaloyl chloride. The melting point of the product was 199–200° C. and the yield 81% of theory.

EXAMPLE 10

2-(p-chloro-phenylamino)-5-propionylamino-pyrimidine 20 g. of 2-(p-chloro-phenylamino)-5-nitropyrimidine were hydrogenated by a method analogous to that of Example 4a and the hydrogenation solution after filtering directly reacted with 10 ml. of propionyl chloride. After 2 hours' standing the solution was concentrated to 100 ml., alkalized with aqueous ammonia and sufficient water added to effect clouding. The compound crystallized upon rubbing and was recrystallized once from methanol-water. The melting point of the product was 233–237° C. and the yield 5 g.

EXAMPLE 11

(a) 2 - (p - methoxy-phenylamino)-5-propionylamino-pyrimidine.—The product of Example 5 was reacted with propionic acid chloride and purified in a manner analogous to that of Example 6a. The melting point of the product was 203–206° C. and the yield 80% of theory.

(b) 2 - (p - methoxy-phenylamino) - 5 - pivaloylamino-pyrimidine was prepared analogously using pivaloyl chloride. The melting point of the product was 206–207° C. and the yield 91% of theory.

EXAMPLE 12

2-phenylamino-4,5-diamino-6-hydroxy-pyrimidine

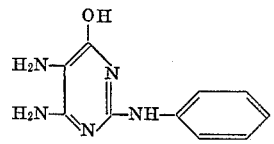

A solution of 0.5 mol of phenylguanidine·HCl, 0.5 mol of sodium ethylate and 0.5 mol of oximino-cyanacetic acid ethyl ester

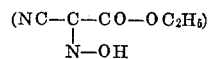

in 800 ml. of ethanol was allowed to stand for 24 hours at 20° C. The solution was then filtered and the alcohol boiled off. The syrup remaining as a residue was dissolved in 1.5 liters of water and boiled for 90 minutes under reflux with 110 g. of sodium dithionite (sodium hydrosulfite). The product crystallized out after cooling the filtered solution. It was filtered off and recrystallized from dioxane/ether. Its melting point was 113–116° C. and the yield 30 g.

EXAMPLE 13

(a) 2 - phenylamino - 4 - amino-5-propionylamino-6-hydroxy-pyrimidine.—15 g. of the product of Example 11 were reacted while stirring with 9.2 g. of propionyl chloride in 100 ml. of dioxane. After 30 minutes 200 ml. of ether were added thereto. The mixture was cooled and decanted from the oil which separated out. This was dissolved in a small quantity of water and the solution saturated with potash. The crystals which separated out were recrystallized once from water. The melting point of the product was 133–140° C. and the yield 8 g.

(b) 2 - phenylamino - 4 - amino-5-carbethoxyamino-6-hydroxy-pyrimidine was prepared analogously using chloroformic acid ethyl ester instead of the propionyl chloride. The melting point of the product was 150–155° C. and the yield 6 g. (based on 15 g. amine).

What is claimed is:
1. A compound selected from the group consisting of substituted amino pyrimidines of the formula

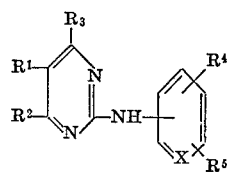

wherein $R^1$ is selected from the group consisting of —$NH_2$, —NHCO-lower alkyl, —NHCO-lower alkenyl and —NHCOO-lower alkyl, each of $R^2$ and $R^3$ taken individually is selected from the group consisting of H, $NH_2$ and OH, $R^4$ is selected from the group consisting of H, —NH-phenyl, —NH-phenyl—$CF_3$, —$CF_3$, lower alkyl, lower alkoxy and halogen, $R^5$ is selected from the group consisting of H, lower alkyl, lower alkoxy and halogen, and X is selected from the group consisting of =CH— and =N—, and their phamaceutically acceptable acid addition salts.

2. The compound according to claim 1, 2-phenylamino-, 5-propionylamino-pyrimidine.

References Cited

Brown, The Pyrimidines, Interscience, New York, 1962, p. 505.

ALEX MAZEL, Primary Examiner

R. J. GALLAGHER, Assistant Examiner

U.S. Cl. X.R.

260—296, 565; 424—251